July 8, 1952  C. C. PECK ET AL  2,602,869
WELDING DEVICE
Filed March 3, 1950  6 Sheets-Sheet 1

INVENTORS
CECIL C. PECK AND
WILLARD GUNZELMAN
BY Oberlin + Limbach
ATTORNEYS

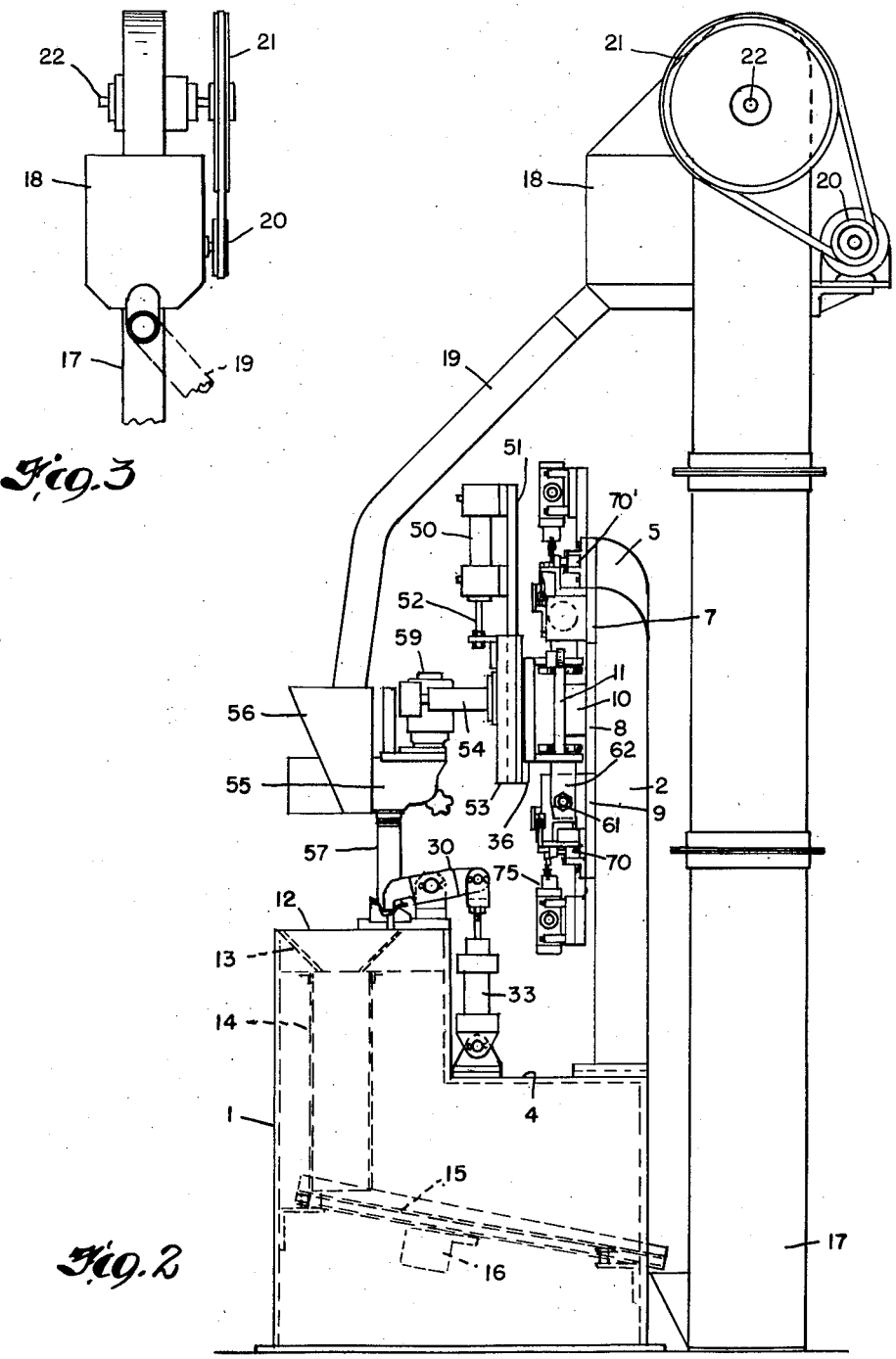

July 8, 1952  C. C. PECK ET AL  2,602,869
WELDING DEVICE

Filed March 3, 1950  6 Sheets-Sheet 3

INVENTORS
CECIL C. PECK AND
BY WILLARD GUNZELMAN

Oberlin & Limbach
ATTORNEYS.

July 8, 1952    C. C. PECK ET AL    2,602,869
WELDING DEVICE
Filed March 3, 1950    6 Sheets-Sheet 4
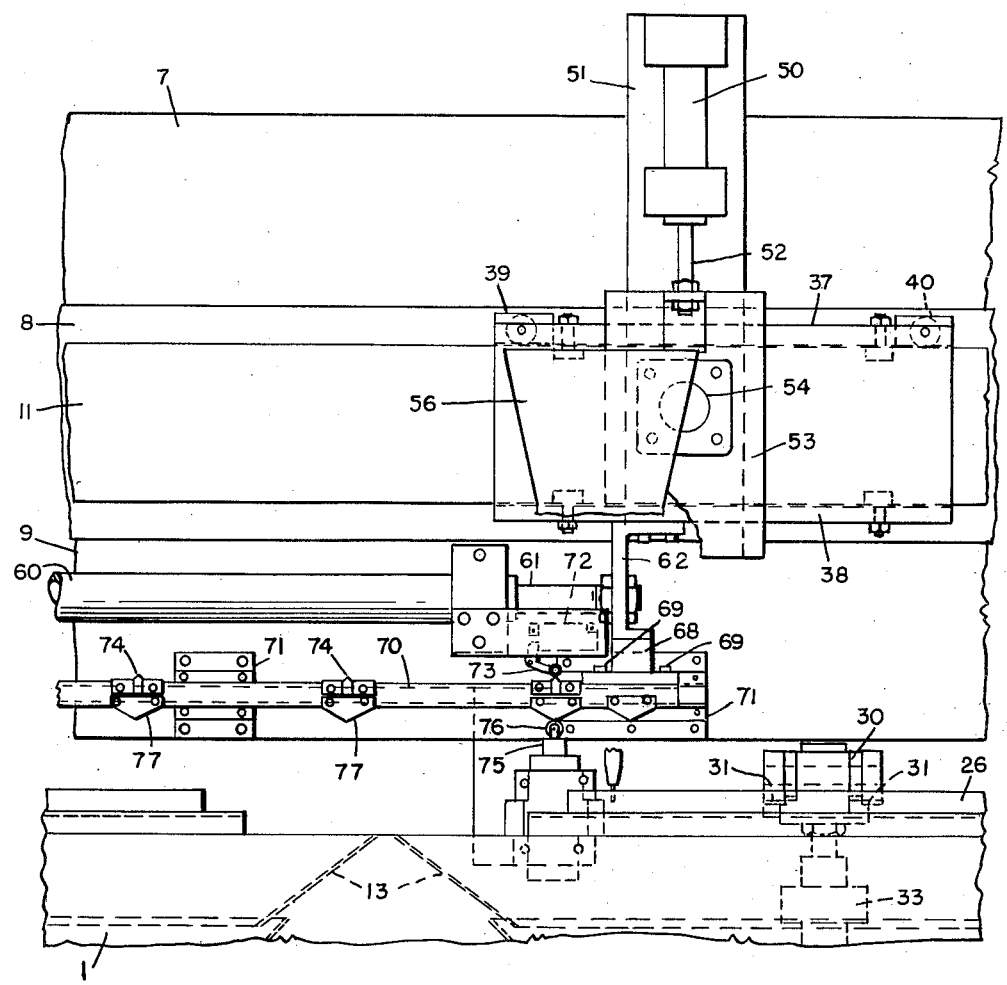
Fig. 5
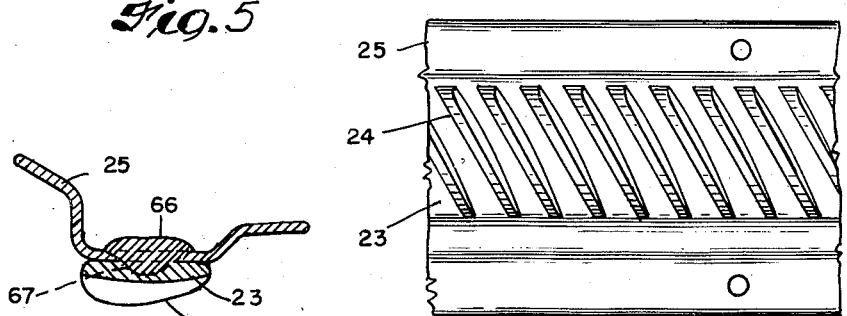
Fig. 13
Fig. 12
INVENTORS
CECIL C. PECK AND
BY WILLARD GUNZELMAN
Oberlin & Limbach
ATTORNEYS.

INVENTORS
CECIL C. PECK AND
WILLARD GUNZELMAN
BY Oberlin & Limbach
ATTORNEYS.

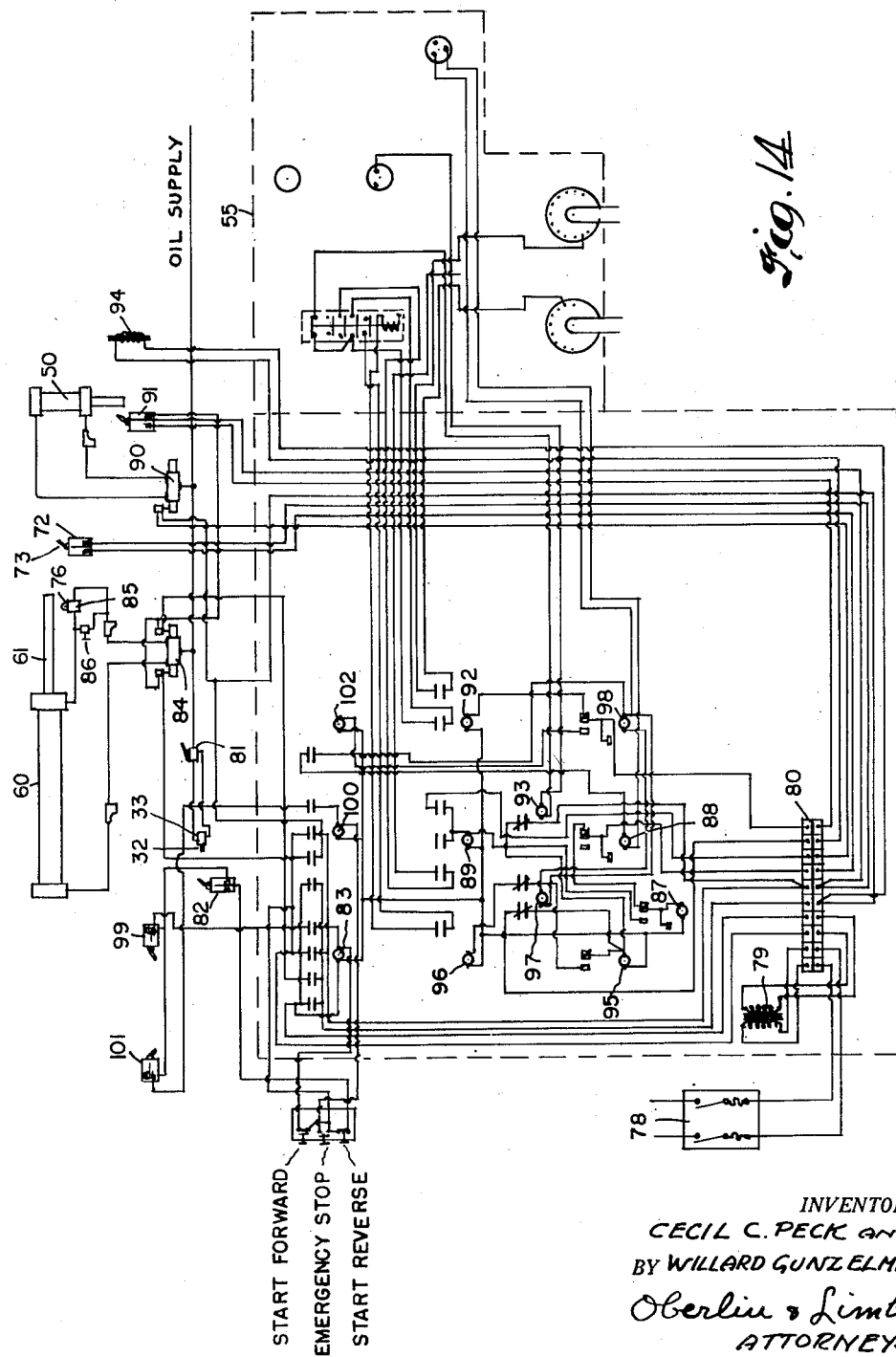

Patented July 8, 1952

2,602,869

UNITED STATES PATENT OFFICE 2,602,869

WELDING DEVICE

Cecil C. Peck, Euclid, and Willard Gunzelman, Gates Mills, Ohio, assignors to Cecil C. Peck Company, East Cleveland, Ohio, a corporation of Ohio Application March 3, 1950, Serial No. 147,376

11 Claims. (Cl. 219—8)

This invention relates as indicated to a novel welding device and method of welding and more particularly to a device and method employing the electric arc and a welding electrode to join two metal members together.

The designing engineer has available a variety of methods and techniques for joining metal parts. Thus, rivets have long been standard in the fabrication of steel frame structures such as buildings and bridges. Electric arc welding is commonly employed to join abutting edges of steel plates, and spot welding is frequently used in the mass production of articles comprised of sheet metal stampings and the like. Each method has its special advantages and deficiencies. Consequently, situations not infrequently arise when no one of such commonly employed methods is suitable in achieving the desired physical characteristics at low cost and with sufficient rapidity to permit of the employment of mass production techniques. One such situation arises, for example, when it is desired to secure a forged combine rasp bar to its channel-form support, the latter ordinarily being a heavy stamping or rolled member. Such rasp bar may be three feet or more in length and must be very firmly and accurately mounted in view of the heavy stresses and strains to which it is subjected in use. Spot welding is not practicable due to the thickness of the two articles to be joined, riveting is not practicable since the exposed face of the rasp bar is provided with fairly closely spaced serrations, and the usual arc welding operation would take too long, requiring the laying of a substantially continuous bead along both sides of the bar.

It is accordingly a primary object of our invention to provide an arc welding device and method whereby two metal members may be joined in a local region only to obtain an effect similar to riveting but without penetrating entirely through one of the members thus joined.

Another object is to provide such device which will be automatically operative thus to secure together two such members at spaced points along their lengths.

Still another object is to provide such machine in which the usual automatic arc welding head adapted to feed a continuous length of weld rod to the work may be employed.

Other objects will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 2 is an end elevational view of the machine of Fig. 1;

Fig. 3 is a front elevational view of the upper portion of one of the flux return elevators servicing each of the two respective welding heads;

Fig. 5 is a fragmentary front elevational view of the center portion of the dual machine of Fig. 1;

Fig. 12 is a fragmentary view of a section of a combine rasp bar illustrative of the type of product which may be fabricated upon the machine of our invention;

Fig. 13 is an end elevational view of such rasp bar; and

Fig. 14 is an electric and fluid pressure diagram of the control system for our new machine.

Figure 1:
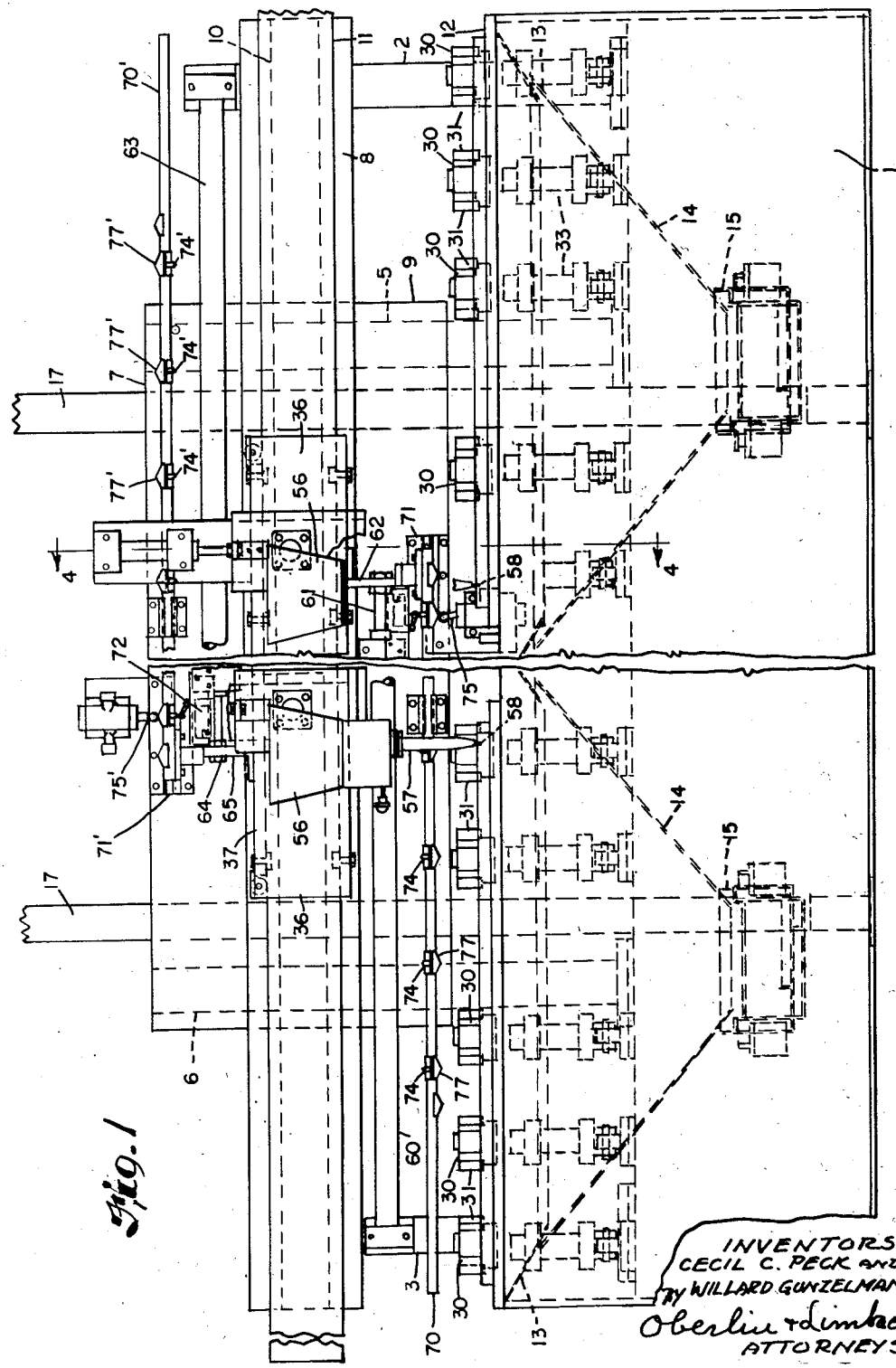
Fig. 1 is a front elevational view of a dual machine embodying the principles of our invention wherein two sets of work-pieces may be simultaneously operated upon.

Referring now more particularly to such drawing and especially Figs. 1-4 thereof, the preferred embodiment of our invention there illustrated comprises a main frame 1 fabricated of welded steel plate and supporting end columns 2 and 3 adjacent the respective ends of its lower rear deck 4. Also carried by such base frame intermediate columns 2 and 3 are slightly higher columns 5 and 6 which have welded thereto three abutting horizontally disposed backing plates 7, 8 and 9. Plates 7 and 9 are of the same length but intermediate plate 8 is considerably longer and has a spacer bar 10 welded thereto to the face of which is welded a slightly wider plate 11 adapted to serve as a trackway for a purpose explained below.

The forward upper deck 12 of base 1 includes a trough 13 leading to a chute 14, the lower end of which leads to an inclined conveyor trough 15 of conventional design adapted to be shaked by jogging mechanism 16 to cause its contents to travel downwardly into the lower end of elevator 17. Such elevator 17 is also of generally conventional design comprising an endless chain provided with scoops adapted to pick up material in the lower end of the elevator and transport it to a hopper 18 at the upper end thereof for discharge down flexible hose 19. The elevator chain (not shown) may be driven by pulley 21 on shaft 22, powered by motor-driven pulley 20. As indicated in Fig. 1, two such trough and elevator systems are provided in the dual machine there illustrated which is adapted to accommodate two sets of work-pieces simultaneously, as later explained in more detail.

The work holding means

The work, in the example here illustrated, comprises a combine rasp bar 23 having serrations 24 which is to be attached to a channel-form supporting member 25. Such bar and channel will preferably first be tack welded together at spaced intervals therealong in order to facilitate handling of the same.

A work-piece holder comprising two spaced bars 26 and 27 extends across the width of the machine above the rear portion of troughs 13. Such bars 26 and 27 are somewhat spaced apart to permit any excess granular flux to drop down into troughs 13. Such troughs may desirably be provided with screens 28 to catch any fragments of coalesced flux which may drop therein. The upper surfaces of bars 26 and 27 are contoured to conform to the shape of the rasp bar whereby to orient and firmly seat the latter in the machine. A plurality of brackets 29 are adjustably mounted along the rear side of upper deck 12 and are provided with bifurcated finger members 30 pivotally mounted thereon. The two spaced finger ends 31 are turned down to bear against the back of channel member 25 and clamp the same firmly against underlying rasp bar 23. Each such clamping finger is operated by a fluid pressure piston 32 and cylinder 33 pivotally mounted at 34 on a bar 35 likewise adapted to be adjustably positioned lengthwise of the work supporting fixture. As will be explained below in conjunction with a description of the operation of the machine as a whole, all of the fluid pressure piston-cylinder assemblies for the right-hand side of the machine are adapted to operate simultaneously and likewise such fluid pressure assemblies on the left-hand side of the machine will operate simultaneously but not necessarily at the same time as those on the right-hand side.

The arc welding mechanism

Figure 6:
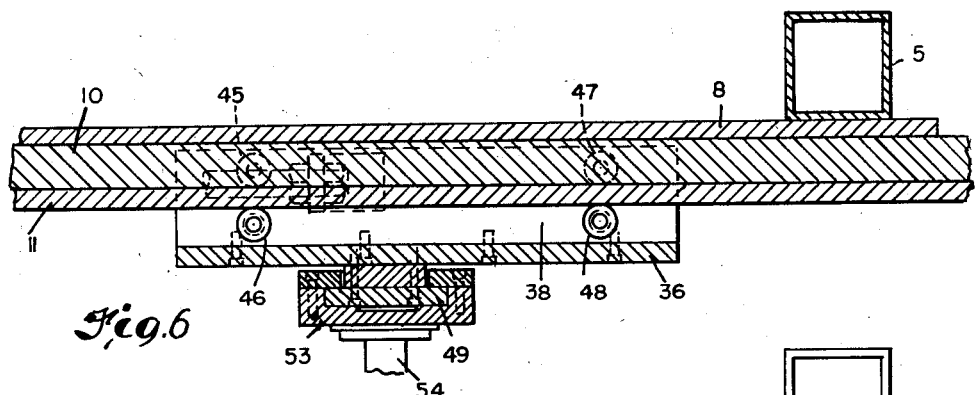
Fig. 6 is a horizontal sectional view taken along the line 6—6 on Fig. 4 and showing one of the welding head supporting carriages.
Figure 7:
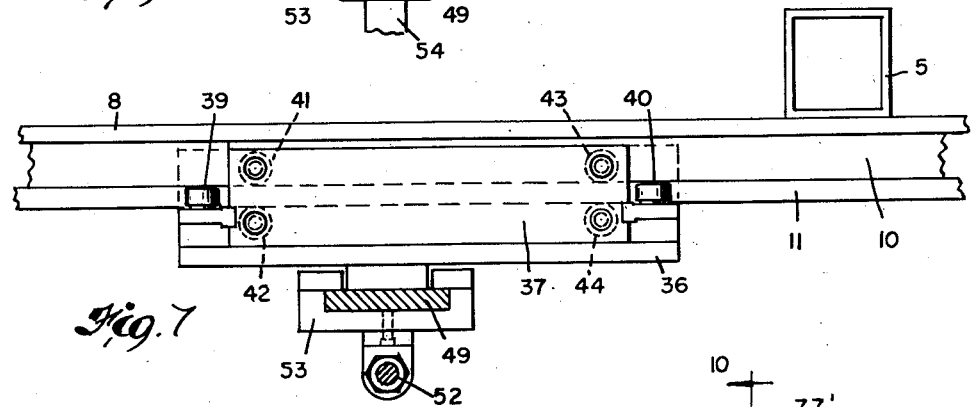
Fig. 7 is a similar view taken along the line 7—7 on Fig. 4 somewhat higher on the machine.

Two identical arc welding heads are mounted upon individual carriages for independent traverse back and forth above their respective work-pieces. Each welding head supporting carriage comprises a flat plate 36 (see Figs 6 and 7) having an upper flange member 37 adapted to extend over rail 11 and a lower flange member 38 extending beneath such rail. Two rollers 39 and 40 carried by such upper flange 37 rest upon the top of the rail and support the carriage. Four pair of spaced rollers 41, 42; 43, 44; 45, 46; and 47, 48 likewise carried by such upper and lower flanges bear against opposite sides of rail 11 mounting the carriage for reciprocation therealong. A vertical slideway 49 is secured to plate 36 of each such carriage and carries a vertically disposed fluid pressure cylinder 50 on its upper extension 51. Piston 52 of such cylinder is secured to slide 53 and is thereby operative to reciprocate such slide up and down on slideway 49.

A fordwardly extending arm 54 on such slide carries a conventional arc welding head 55. Such head is provided with a flux receiving hopper 56 into which the lower end of flexible hose 19 is adapted to extend, such hopper feeding flux to the tubular conduit 57 enclosing the continuous bare wire electrode 58 drawn from a reel (not shown). An electric motor 59 on head 55 serves to advance the electrode toward the work.

The traversing mechanism

While the right- and left-hand parts of the machine so far described have been identical (that is to say, mirrow images of one another), the traversing mechanisms for the respective welding heads while identical in detail are, however, offset one from the other as best shown in Fig. 1.

The traversing mechanism for the right-hand welding head comprises a fluid pressure cylinder 60 secured at one end to column 3 and at the other end to lower backing plate 9. The piston 61 extending from the right-hand end of such cylinder is secured to depending bracket 62 mounted on the underside of lower flange member 38 of the welding head carriage. Thus, when piston 61 is extended from cylinder 60, the right-hand welding head will be moved to the right as viewed in Fig. 1, and such welding head will be returned to the left when such piston is retracted.

A similar traversing mechanism for the left-hand welding head comprises elongated cylinder 63 secured at its right-hand end to the upper portion of column 2 and at its left-hand end to upper backing plate 6. Piston 64 extending therefrom is attached to upstanding bracket 65 mounted on upper flange member 37 of the left-hand welding head carriage. Such latter carriage and welding head will therefore be moved to the left along rail 11 when such piston is further extended.

General operation

Figure 4:
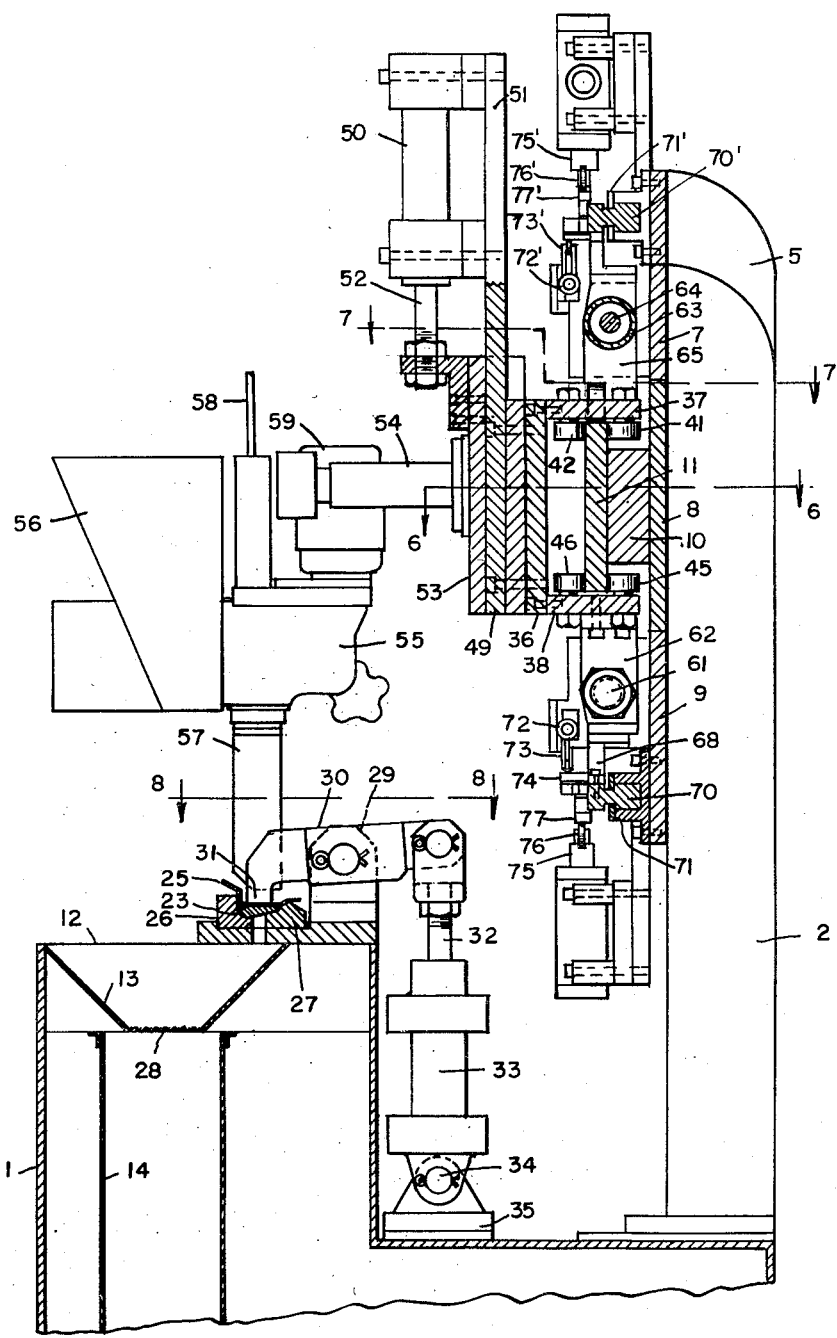
Fig. 4 is a vertical sectional view taken along the line 4—4 on Fig. 1 and showing the mounting of one of such welding heads and work clamping means on an enlarged scale.
Figure 8:
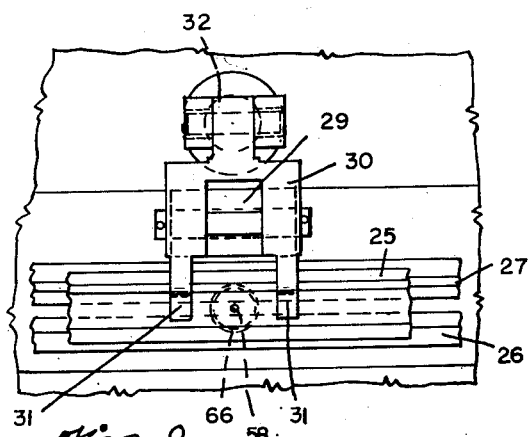
Fig. 8 is a fragmentary top plan view of one of the work clamping devices taken on the line 8—8 on Fig. 4.
Figure 9:
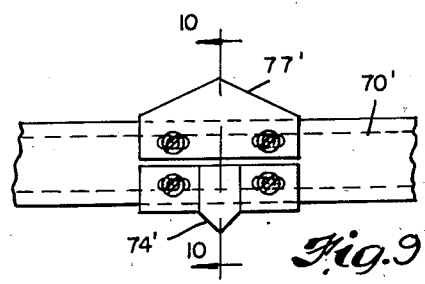
Fig. 9 is a front elevational detail view of a portion of one of the control bars having control cams mounted thereon.
Figure 10:
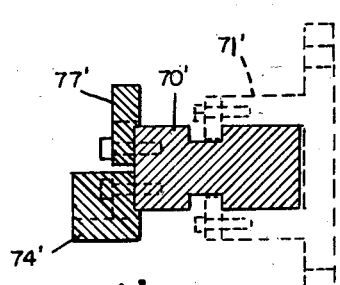
Fig. 10 is a vertical sectional view taken along the line 10—10 on Fig. 9.
Figure 11:
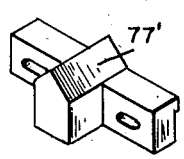
Fig. 11 is a detail perspective view of one of the cams mounted on such control bar.

As shown in Figs. 4 and 8, the work-piece assembly is located in the fixture comprising contoured bars 26 and 27 with the rasp bar proper 23 underneath and the channel 25 on top. Piston-cylinder assemblies 32, 33, are now actuated to rock clamping fingers 30 to bring downturned finger ends 31 into clamping engagement with the work. As above explained, each such finger is provided with two such spaced finger ends, the regions therebetween demarking the locations of the welds now to be made. The two work-pieces are thus particularly firmly clamped together in such regions.

The two sections of the dual machine are capable of independent operation so that a single operator may remove and replace work from one section while the other section is automatically completing its cycle.

Upon pressing the "start" button, the welding head is caused automatically to traverse until it is above the first clamping finger with the end of electrode 58 directed toward the work between finger ends 31. The welding head now descends to operating position and begins to inch the electrode toward the work. When the electrode contacts the work, flux is discharged from hopper 56 and tube 57, covering the electrode end, and the arc starts. After expiration of a predetermined period of time, the arc is shut off and the welding head raised, whereupon the head now traverses until above the next finger where the above-described cycle is repeated. This sequence of traverses and welding operations continues until a weld has been made between each pair of clamping finger ends. The clamps are now raised and the operator removes the finished welded article and again loads the machine. The next sequence of operation is the same as before except that the welding head will traverse in the opposite direction.

As best shown in Figs. 8 and 13, each weld will comprise a head or button 66 of deposited weld metal and a further narrower portion of melted metal 67 extending through channel 25 well into rasp bar 23 but not penetrating to the underside of the latter. Channel 25 is thus secured to bar 23 by means of a weld which in addition to the usual weld bond also resembles a rivet in mechanically holding the two members together.

Excess granulated flux drops into trough 13, the operator brushing off the work-holding fixture before placing new work therein. The screen 28 catches any coalesced fragments of flux which may not adhere to the work and the excess granulated flux descends to the lower end of elevator 17, is lifted to the top of the latter, and returned to hopper 56 of the welding head through flexible hose 19. The operator may conveniently replenish the flux supply from time to time simply by depositing additional flux in trough 13.

Detailed operation

Reference may now additionally be had to Fig. 14 of the drawing, in conjunction with Figs. 1, 2, 4, 5, and 9 to 11 inclusive, for an understanding of the manner in which the movements of the welding heads and work clamping means are controlled.

Each welding head is provided with its own control system since the machine is a dual machine, each side of which may be operated independently of the other. Fig. 14 accordingly diagrammatically illustrates the electrical and fluid pressure system for but one of such sides.

The right-hand welding head 55 (as viewed in Fig. 1) is connected by means of depending bracket 62 with the end of piston 61. Such bracket is also joined by means of downwardly extending leg 68 and screws 69 to control bar 70 mounted in interrupted slideway 71 for reciprocation with and parallel to piston 61. A limit switch 72 is mounted on backing plate 9 adjacent the end of cylinder 60 and provided with a downwardly extending operating arm 73 adapted to be successively engaged by upper cams 74 mounted at spaced intervals on control bar 70. Such cams are spaced at intervals corresponding to the spacing of the work clamping fingers 30 and serve to operate limit switch 72 to halt the welding head at each welding station in a manner explained below. Such limit switch is also operative to close the circuit controlling lowering of the welding head into welding position at each such station. Below bar 70 is a spring-backed plunger 75 carrying a roller 76 at its upper end adapted to be engaged by lower cams 77 on bar 70 to depress such plunger. The purpose of this plunger is to operate means slowing down the transverse movement of the welding head just before the latter is brought to a stop by operation of switch 72. This avoids jerky movement of the head and permits halting the same at precisely the desired point. Both types of cams are beveled on each side, permitting the control mechanism to function in both directions. Since limit switch 72 is above plunger 75, the upper and lower cams are disposed in corresponding pairs. They may be adjustably positioned along bar 70 as necessary to ensure actuation of the welding head at the proper points with regard to the work-clamping fingers.

As indicated, the left-hand welding head (Fig. 1) is similarly controlled, its control bar 70' being mounted in slideway 71' for reciprocation parallel to traversing piston 64. Limit switch 72' is mounted on backing plate 7 adjacent the end of cylinder 63 and below bar 70', its upwardly extending operating arm 73' being adapted to be successively engaged by lower cams 74' mounted at spaced intervals on such bar. Above bar 70' is a spring-backed plunger 75' carrying a roller 76' at its lower end adapted to be engaged by upper cams 77' on bar 70' to reciprocate such plunger as such bar is traversed. The function of all such elements is as described above in connection with the right-hand welding head.

Referring now more specifically to Fig. 14 of the drawing, the operation of one such welding head will now be described in detail. The operator places the work such as bar 23 and channel 25 in the work holder comprising fixtures 26 and 27. He then throws main switch 78, energizing the electric circuit through control transformer 79 and terminal block 80, and operates 4-way hand valve 81, admitting fluid pressure to clamping cylinders 33 and causing fingers 30 firmly to clamp the work. Such actuation of cylinders 33 and their pistons 32 causes the latter to engage and operate limit switch 82, completing the welding head traversing circuit except for the "Forward" button. It will thus be seen that the welding head cannot normally be actuated until the work has been properly clamped in position.

The operator now depresses such "Forward" button, energizing control relay 83 which operates solenoid-controlled valve 84 to admit fluid pressure to the left-hand end of cylinder 60 (Fig. 14), thereby causing welding head 55 to begin its traverse. When the first cam 77 engages roller 76 of plunger 75, the latter is depressed to close straight-way valve 85 and thereby throttle down the speed of such traverse since fluid flow is now by-passed through needle valve 86. Simultaneously, the first cam 74 engages arm 73 of limit switch 72, energizing time delay control relay 87 through the normally closed contacts of relay 88. This energizes relay 89 which closes the conventional arc holding circuit of the welding head and actuates four-way valve 90, admitting fluid pressure to the upper end of cylinder 50 to lower the welding head into welding position.

When the welding head reaches welding position, limit switch 91 is operated thereby, energizing control relay 92, closing the electrode wire feed motor armature circuit and wire inching circuit (conventional in automatic arc-welding heads) and thereby causing the wire electrode to be moved toward the work and contact the same between the spaced finger ends 31 of clamping member 30. When the wire thus contacts the work, the welding circuit is closed, actuating control relay 93 which energizes flux valve solenoid 94 to cause flux to be delivered from hopper 56 down tube 57 about the electrode and upon the work. Actuation of relay 93 also serves to energize time delay control relay 95 which in turn energizes relay 96, starting the arc. Relay 96 accomplishes this result by closing the field circuit of the conventional welding generator and thereby causing a welding current to be sent through the previously closed welding circuit. When the arc is started relays 97 and 98 are energized, relay 97 de-energizing relay 96. When the allotted welding time has elapsed, time-delay relay 98 de-energizes relay 92 and energizes relay 102 which energizes control relay 88. Relay 88 in turn de-energizes relay 89, thereby de-energizing the arc-holding circuit, shutting off the arc, reversing valve 90 to elevate the welding head, and again operating valve 84 to admit fluid pressure to cylinder 60 to resume the traverse of the head. While time-delay relay 87 is of course again actuated when the welding head rises to its upper position, the head traverses away from the actuating cam before such time delay period runs out so the head will not be reciprocated downwardly until the next cams reach operative position. The next set of cams thereupon become effective to repeat the welding cycle when the welding head attains a position above the next work-holding clamp.

It will, of course, be understood that the welding head above described is not of our invention but is the well-known and commercially available Lincoln automatic arc-welding head. No detailed explanation of its construction and operation is accordingly required, since it is well known to those skilled in the art. The manner of traversing and reciprocating the same, and the welding operation performed, are however believed to be novel and to produce much improved results.

When the welding head has completed the full traverse, limit switch 99 is engaged, dropping out control relay 83 and shutting off the complete control circuit. The operator thereupon again operates hand valve 81 to open the clamps and removes the welded work-piece. After loading the machine and closing the clamps, he now presses the start "Reverse" button, energizing control relay 100 and the sequence of operation above described is repeated, but with the traverse in the reverse direction since valve 84 is shifted to apply fluid pressure to the rod end of cylinder 60. Upon completion of the entire traverse in this direction, limit switch 101 is engaged, dropping out control relay 100 and shutting off the control circuit. The operator unclamps and unloads the work, and the machine is again ready for reloading and "forward" operation.

It will thus be seen that we have provided novel welding mechanism adapted automatically to weld two members together at spaced points therealong. We obtain the advantages of arc-welding, spot-welding, and riveting in a single operation, obtaining a localized weld which need not penetrate entirely through both such members. The resultant assembly is extremely strong and rigid and capable of withstanding very severe usage. The electrode is not ordinarily traversed during the actual welding operation, a rivet-like weld being produced having a button or head on the upper surface. It is, however, possible to traverse the electrode during the welding operation, if desired, to produce an elongated weld of this type. A bare wire electrode is ordinarily employed and a relatively high current density, up to 750 and even 1000 amperes with one-eighth inch diameter electrodes is utilized.

Other modes of applying the principle of the invention may be employed, change being made as regards the details described, provided the features stated in any of the following claims or the equivalent of such be employed.

We therefore particularly point out and distinctly claim as our invention:

1. In welding apparatus for arc-welding two elongated metal members together in spaced local regions along their length, supporting means adapted to support such members in juxtaposed position in a horizontal plane, a series of pairs of pivotally mounted spaced clamping fingers adapted to clamp such members together on said supporting means, fluid pressure piston-cylinder assemblies operative to rock said pairs of fingers thus to clamp and unclamp the work, an automatic arc-welding head mounted for horizontal traverse above and parallel to such work, a fluid pressure piston-cylinder assembly operative thus to reciprocate said head, a vertically disposed piston-cylinder assembly supporting said head and adapted to traverse therewith, said latter assembly being operative to lower and raise said head into and out of welding position relative to such work, control means adapted automatically to stop such traverse of said head above said pair of clamping fingers in sequence, with the welding electrode of said head directed toward the region of such work therebetween, and control means thereupon operative to actuate said vertically disposed piston-cylinder assembly to lower said head into welding position, and to raise said head out of welding position upon expiration of a predetermined welding time interval.

2. In welding apparatus for arc-welding two elongated members such as a combine rasp bar and a channelform support together in spaced local regions along their length, a jig adapted to support such bar in horizontal position with such channel resting thereon, a series of pairs of pivotally mounted downturned clamping fingers at spaced intervals therealong adapted to clamp such members together on said jig, fluid pressure piston-cylinder assemblies operative to rock said pairs of fingers thus to clamp and unclamp such work, a trackway parallel to said jig and such work, a carriage mounted for reciprocation along said trackway, a vertically disposed slideway on said carriage, an automatic arc welding head mounted for vertical reciprocation along said slideway above such work, a fluid pressure piston-cylinder assembly operative thus vertically to reciprocate said head into and out of welding position, a fluid pressure piston-cylinder assembly operative to reciprocate said carriage, control means adapted automatically to stop such traverse of said carriage with said head above each said pair of clamping fingers in sequence, with the welding electrode of said head directed toward the region therebetween, control means thereupon operative to actuate said piston-cylinder assembly operative to lower said head into welding position, and to raise said head out of welding position upon expiration of a predetermined welding time interval, a flux elevator, a flexible hose leading from the upper end of said elevator adapted to deliver flux therefrom to said welding head, a trough beneath said jig adapted to receive surplus flux, and means adapted to deliver flux from said trough to the lower end of said elevator.

3. In welding apparatus for arc-welding two elongated metal members together in spaced local regions along their length, means operative tightly to clamp such members together, an automatic arc-welding head mounted for horizontal traverse above and parallel to such work, means operative thus to traverse said arc-welding head, means operative vertically to reciprocate said arc-welding head to lower and raise the same into and out of welding position relative to such work, a control bar connected to said arc-welding head for horizontal travel therewith, said control bar extending parallel to such horizontal path of travel, electric control means adapted to energize such means for vertical reciprocation of said arc-welding head and including a switch operative when actuated to energize said electric control means, and a plurality of switch actuating members secured in longitudinally spaced relation on said control bar adapted sequentially to actuate said switch during such horizontal traverse of said arc-welding head.

4. In welding apparatus for arc-welding metal members together in spaced local regions, clamping means operative firmly to clamp such members together, an arc-welding head mounted for traverse parallel to such work and for reciprocation toward and away from such work, drive means operative thus to reciprocate said arc-welding head along such path of horizontal traverse, drive means operative to reciprocate said head toward and away from such work into and out of welding position, control means automatically operative to halt such horizontal traverse at predetermined locations, and control means automatically operative to actuate said second drive means to reciprocate said head toward said work for initiation of a welding operation and to withdraw said head out of welding position after elapse of a predetermined welding interval and prior to further traverse of said head.

5. In welding apparatus for arc-welding metal members together in spaced local regions, clamping means operative firmly to clamp such members together, an arc-welding head mounted for traverse parallel to such work and for reciprocation toward and away from such work, drive means operative thus to reciprocate said arc-welding head along such path of horizontal traverse, drive means operative to reciprocate said head toward and away from such work into and out of welding position, control means automatically operative to halt such horizontal traverse at predetermined locations, and control means automatically operative to actuate said second drive means to reciprocate said head toward said work for initiation of a welding operation and to withdraw said head out welding position after elapse of a predetermined welding interval.

6. In welding apparatus for arc-welding metal members together in spaced local regions, clamping means operative firmly to clamp such members together, an arc-welding head mounted for traverse parallel to such work and for reciprocation toward and away from such work, drive means operative thus to reciprocate said arc-welding head along such path of horizontal traverse, drive means operative to reciprocate said head toward and away from such work into and out of welding position, and control means automatically operative to actuate said second drive means to reciprocate said head toward said work for initiation of a welding operation and to withdraw said head out of welding position after elapse of a predetermined welding interval.

7. In welding apparatus for arc-welding metal members together in spaced local regions, clamping means operative firmly to clamp such members together, an arc-welding head mounted for traverse parallel to such work and for reciprocation toward and away from such work, drive means operative thus to reciprocate said arc-welding head along such path of horizontal traverse, drive means operative to reciprocate said head toward and away from such work into and out of welding position, a control bar mounted for travel with said head on such horizontal traverse, said bar extending parallel to the path of such traverse, a plurality of control-actuating members on said bar at spaced intervals therealong, and control means positioned for repeated actuation by said control-actuating members during traverse and to energize said drive means operative to reciprocate said head toward and away from such work.

8. In welding apparatus for arc-welding metal members together in spaced local regions, clamping means operative firmly to clamp such members together, an arc-welding head mounted for traverse parallel to such work and for reciprocation toward and away from such work, drive means operative thus to reciprocate said arc-welding head along such path of horizontal traverse, drive means operative to reciprocate said head toward and away from such work into and out of welding position, means automatically operative to halt such traverse of said head at a plurality of predetermined stations, and means automatically operative to energize said drive means to reciprocate said head toward and away from such work into and out of welding position during the period of each such halt, said head being operative to make a weld when in stationary position adjacent such work at predetermined length of time, and said head being capable of further traverse only after interruption of each such local welding operation.

9. In welding apparatus for arc-welding metal members together in local regions, supporting means adapted to support such members in superimposed position thereon; clamping means comprising a pair of spaced clamping fingers pivotally mounted to rock into and out of clamping engagement with such work to clamp the latter firmly together against said supporting means, a fluid pressure piston-cylinder assembly operative thus to rock said fingers; an automatic arc-welding head mounted for reciprocation toward and away from one of such members into and out of welding position with regard thereto in the local region between said fingers, said fingers being spaced to lie closely to either side of the weld thereby produced; and means adapted to restrain said head against movement during the welding operation.

10. In welding apparatus for arc-welding metal members together in local regions spaced from the edges thereof, spaced clamping fingers operative to engage one such member to force such members together against a support; an automatic arc-welding head mounted for reciprocation toward and away from the local region of such member lying between said fingers, thus moving into and out of welding position, said fingers being spaced to lie closely to either side of the weld thereby produced; and means adapted to restrain said head against lateral movement during the welding operation.

11. In welding apparatus for arc-welding metal members together in spaced local regions, clamping means operative firmly to clamp such members together, an arc-welding head mounted for traverse parallel to such work and for reciprocation toward and away from such work, drive means operative thus to reciprocate said arc-welding head along such path of horizontal traverse, drive means operative to reciprocate said head toward and away from such work into and out of welding position, a control bar mounted for travel with said head on such horizontal traverse, said bar extending parallel to the path of such traverse, a plurality of cams on said bar at spaced intervals therealong, an electric control system including a switch adapted to be engaged and operated by said cams, said control system thereupon being operative to stop said head traverse drive means, energize said head drive means effective to reciprocate said head toward such work, close the arc holding circuit of the electrode carried by said welding head, and energize the electrode feed motor of said head, and time delay means operative after elapse of a predetermined welding period to de-energize such arc holding circuit, energize said drive means to reciprocate said head away from such work, de-energize such electrode feed motor, and re-energize said head traverse drive means to resume traverse of said head until the next said cam engages said switch.

CECIL C. PECK.
WILLARD GUNZELMAN.

REFERENCES CITED

The following references are of record in the file of this patent:

UNITED STATES PATENTS

| Number | Name | Date |
|---|---|---|
| 1,590,314 | Probert et al. | June 29, 1926 |
| 1,640,437 | Chapman | Aug. 30, 1927 |
| 1,668,783 | Rupley | May 8, 1928 |
| 1,824,631 | Saxe | Sept. 22, 1931 |
| 2,031,138 | Taylor | Feb. 18, 1936 |
| 2,102,455 | Bonsall | Dec. 14, 1937 |
| 2,105,079 | Holslag | Jan. 11, 1938 |
| 2,153,785 | Williams | Apr. 11, 1939 |
| 2,189,399 | Lewkers | Feb. 6, 1940 |
| 2,275,943 | Bayley | Mar. 10, 1942 |
| 2,345,037 | De Gray | Mar. 28, 1944 |
| 2,345,918 | Dahlstrand | Apr. 4, 1944 |
| 2,440,697 | Patterson | May 4, 1948 |
| 2,466,497 | Smith | Apr. 5, 1949 |